United States Patent
Lee

(10) Patent No.: US 11,881,597 B2
(45) Date of Patent: Jan. 23, 2024

(54) BATTERY MODULE WITH IMPROVED SAFETY, BATTERY PACK COMPRISING BATTERY MODULE, AND VEHICLE COMPRISING BATTERY PACK

(71) Applicant: LG CHEM, LTD., Seoul (KR)

(72) Inventor: Han-Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 110 days.

(21) Appl. No.: 17/048,477

(22) PCT Filed: Nov. 4, 2019

(86) PCT No.: PCT/KR2019/014840
§ 371 (c)(1),
(2) Date: Oct. 16, 2020

(87) PCT Pub. No.: WO2020/111549
PCT Pub. Date: Jun. 4, 2020

(65) Prior Publication Data
US 2021/0175585 A1    Jun. 10, 2021

(30) Foreign Application Priority Data
Nov. 30, 2018   (KR) .................. 10-2018-0152786

(51) Int. Cl.
*H01M 50/503*      (2021.01)
*H01M 50/249*      (2021.01)
(Continued)

(52) U.S. Cl.
CPC ....... *H01M 50/503* (2021.01); *H01M 50/204* (2021.01); *H01M 50/211* (2021.01);
(Continued)

(58) Field of Classification Search
CPC .. H01M 50/20; H01M 50/204; H01M 50/249; H01M 50/503;
(Continued)

(56) References Cited

U.S. PATENT DOCUMENTS

2011/0177381 A1    7/2011   Oya et al.
2012/0058371 A1    3/2012   Carignan
(Continued)

FOREIGN PATENT DOCUMENTS

CN    103460448 A    12/2013
CN    106133948 A    11/2016
(Continued)

OTHER PUBLICATIONS

Machine translation of WO 2015062695 A1 (Year: 2015).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A battery module blocks current when the temperature rises, a battery pack includes the battery module, and a vehicle includes the battery pack. The battery module includes a bus bar having an approximately thin plate shape compared to a length and a width and having linear grooves provided in a left surface and a right surface along a longitudinal direction, respectively; and battery cells respectively located on the left surface and the right surface of the bus bar, physically contacting with their respective electrode leads inserted into the grooves, and electrically connected to each other with the bus bar interposed therebetween, and wherein sizes of the grooves increase in a thickness direction at a certain temperature or higher to release a physical contact between
(Continued)

the electrode leads and the bus bar such that an electrical connection between the battery cells is released.

9 Claims, 8 Drawing Sheets

(51) Int. Cl.
    *H01M 50/204* (2021.01)
    *H01M 50/588* (2021.01)
    *H01M 50/50* (2021.01)
    *H01M 50/211* (2021.01)
    *H01M 50/574* (2021.01)

(52) U.S. Cl.
    CPC ......... *H01M 50/249* (2021.01); *H01M 50/50* (2021.01); *H01M 50/574* (2021.01); *H01M 50/588* (2021.01); *H01M 2220/20* (2013.01)

(58) Field of Classification Search
    CPC ..... H01M 50/531–536; H01M 50/588; H01M 2220/20; H01M 50/572–583; H01M 50/10; H01M 50/102; H01M 50/105
    See application file for complete search history.

(56) References Cited

U.S. PATENT DOCUMENTS

| | | |
|---|---|---|
| 2012/0156544 A1 | 6/2012 | Schaefer et al. |
| 2013/0330595 A1 | 12/2013 | Lee et al. |
| 2014/0038471 A1 | 2/2014 | Yang et al. |
| 2017/0125774 A1 | 5/2017 | Choi et al. |
| 2018/0198172 A1 | 7/2018 | Choi et al. |
| 2019/0148703 A1* | 5/2019 | Toth .................... H01M 50/517 429/158 |

FOREIGN PATENT DOCUMENTS

| | | | | |
|---|---|---|---|---|
| CN | 206179965 U | | 5/2017 | |
| DE | 102017220505 | * | 5/2019 | .......... H01M 50/528 |
| DE | 102017220505 A1 | * | 5/2019 | .......... H01M 50/528 |
| EP | 2 808 928 A1 | | 12/2014 | |
| JP | 10-154530 A | | 6/1998 | |
| JP | 11-111260 A | | 4/1999 | |
| JP | 2007-26907 A | | 2/2007 | |
| JP | 2010-146735 A | | 7/2010 | |
| JP | 2011-249243 A | | 12/2011 | |
| JP | WO2010/052788 A1 | | 3/2012 | |
| JP | 2014-123433 A | | 7/2014 | |
| JP | 2016-95402 A | | 5/2016 | |
| KR | 10-2006-0039955 A | | 5/2006 | |
| KR | 10-2011-0098108 A | | 9/2011 | |
| KR | 10-2013-0023022 A | | 3/2013 | |
| KR | 10-2015-0028073 A | | 3/2015 | |
| KR | 10-2017-0007996 A | | 1/2017 | |
| KR | 101715695 | * | 3/2017 | .............. H01M 2/20 |
| KR | 10-2017-0139305 A | | 12/2017 | |
| KR | 10-1864290 B1 | | 6/2018 | |
| KR | 10-2018-0091446 A | | 8/2018 | |
| KR | 20180091446 | * | 8/2018 | ............ H01M 10/42 |
| WO | WO-2015062695 A1 | * | 5/2015 | .......... H01M 10/425 |

OTHER PUBLICATIONS

Machine Translation of Shin (Year: 2017).*
Machine Translation of Jeong (Year: 2018).*
International Search Report for PCT/KR2019/014840 dated Feb. 21, 2020.
ESSR for Application No. 19888647.5 dated Oct. 25, 2021.

* cited by examiner

BATTERY MODULE WITH IMPROVED SAFETY, BATTERY PACK COMPRISING BATTERY MODULE, AND VEHICLE COMPRISING BATTERY PACK

TECHNICAL FIELD

The present disclosure relates to a battery module, and more particularly to a battery module that may block the current flow when the temperature rises. The present disclosure also relates to a battery pack including the battery module and a vehicle including the battery pack. The present application claims priority to Korean Patent Application No. 10-2018-0152786 filed on Nov. 30, 2018 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like.

Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active materials and negative electrode active materials, respectively. The lithium secondary battery includes an electrode assembly that assembles a unit cell having a structure in which a positive electrode plate having a positive electrode active material coated on a positive electrode current collector and a negative electrode plate having a negative electrode active material coated on a negative electrode current collector are arranged with a separator interposed therebetween, and a sheath material, that is, a battery case, that seals and accommodates the assembly together with an electrolyte solution. According to the shape of the battery case, lithium secondary batteries are classified into can type secondary batteries in which the electrode assembly is embedded in a metal can and pouch type secondary batteries in which the electrode assembly is embedded in an aluminum laminated sheet pouch.

Recently, secondary batteries are widely used not only in small devices such as portable electronic devices but also in medium and large devices such as vehicles and energy storage systems (ESSs). When secondary batteries are used in such medium and large devices, a large number of secondary batteries are electrically connected to form a battery module or a battery pack in order to increase capacity and output power. In particular, pouch type secondary batteries are widely used in such medium large devices because of advantages such as easy lamination and light weight. Pouch type secondary batteries have a structure in which an electrode assembly to which an electrode lead is connected is accommodated in a pouch case with an electrolyte solution and sealed. A part of the electrode lead is exposed outside the pouch case, and the exposed electrode lead is electrically connected to a device to which secondary batteries are mounted or is used to electrically connect secondary batteries to each other.

FIG. 1 illustrates a part of a battery module manufactured by connecting pouch type battery cells. For example, a state in which two pouch type battery cells are connected in series is shown.

As shown in FIG. 1, pouch type battery cells 10 and 10' include two electrode leads 40 and 40' drawn out of a pouch case 30. The electrode leads 40 and 40' are divided into a positive electrode lead (+) and a negative electrode (−) lead according to an electrical polarity, and are electrically connected to an electrode assembly 20 sealed in the pouch case 30. That is, the positive electrode lead is electrically connected to a positive electrode plate of the electrode assembly 20, and the negative electrode lead is electrically connected to a negative electrode plate of the electrode assembly 20.

There may be various ways of connecting the battery cells 10 and 10' inside the battery module 1. FIG. 1 shows a method of bending the electrode leads 40 and 40' and then placing the electrode leads 40 and 40' on a bus bar 50, performing a welding process on the electrode leads 40 and 40' by laser welding, connecting the electrode lead 40 of the battery cell 10 and the electrode lead 40' of the other battery cell 10' adjacent to the battery cell 10.

Meanwhile, lithium secondary batteries have a risk of explosion when overheated. In particular, as lithium secondary batteries are applied to electric vehicles including electric vehicles (EVs), hybrid electric vehicles (HEVs), plug-in hybrid electric vehicles (PHEVs), etc., in battery modules or battery packs that connect and use a large number of high capacity secondary battery cells, a major accident may occur when an explosion occurs, and thus securing safety is one of main solutions.

A representative cause of a rapid rise in the temperature of a lithium secondary battery is when a short circuit current flows. Short circuit current mainly occurs when a short circuit occurs in an electronic device connected to a secondary battery, and when the short circuit occurs in the lithium secondary battery, a rapid electrochemical reaction occurs in a positive electrode and a negative electrode to generate heat. The generated heat causes the temperature of the battery cell to rise rapidly, causing ignition. In particular, in the case of a battery module or a battery pack including a plurality of battery cells, heat generated from one battery cell is propagated to the surrounding battery cells and affects other battery cells, which increases with a greater risk.

Conventionally, a positive temperature coefficient (PTC) device, a fuse, etc. have been proposed as a means of preventing explosion by blocking current when the temperature inside the secondary battery rises. However, they have a problem in that a separate mounting space is required in a battery module or a battery pack.

Securing safety is very important in that explosion of a battery module or a battery pack not only may cause damage to electronic devices or vehicles, etc., to which it is employed, but also may lead to the safety threat of users and ignition. If the secondary battery is overheated, the risk of explosion and/or ignition increases, and sudden combustion or explosion due to overheating may cause injury to people and property. Therefore, there is a demand for introducing means for sufficiently securing safety in use of secondary batteries.

DISCLOSURE

Technical Problem

The present disclosure is designed to solve the problems of the related art, and therefore the present disclosure is directed to providing a battery module with improved safety by blocking current when the temperature rises, a battery pack including the battery module, and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including a bus bar having a thin plate shape having a length and a width and having linear grooves provided in a left surface and a right surface along a longitudinal direction, respectively; and battery cells respectively located on the left surface and the right surface of the bus bar, respective electrode leads of the battery cells inserted into the grooves, and electrically connected to each other with the bus bar interposed therebetween, and wherein sizes of the grooves increase in a thickness direction at a predetermined temperature or higher to release a physical contact between the electrode leads and the bus bar such that an electrical connection between the battery cells is released.

The grooves may be formed by shape memory alloy plates are stacked in the thickness direction.

The electrode leads may be inserted into the grooves and are physically compressed therein.

A plurality of protrusions may be provided on surfaces of the shape memory alloy plates that face each other.

The electrode leads may be inserted into the grooves and are physically compressed therein and protrusions of the plurality of protrusions on an upper shape memory alloy plate may be provided to engage with protrusions of the plurality of protrusions on a lower shape memory alloy plate upon physical compression.

An electrode lead inserted into the groove of the left surface of the bus bar and an electrode lead inserted into the groove of the right surface may have opposite polarities. At this time, electrode leads of a same polarity may be in two or more battery cells and inserted into the grooves.

Two or more grooves may be provided in one surface and an electrode lead may be inserted into each groove.

In another aspect of the present disclosure, there is provided a battery pack including at least one battery module according to the present disclosure; and a pack case configured to package the at least one battery module.

In another aspect of the present disclosure, there is provided a vehicle including at least one battery pack according to the present disclosure.

Advantageous Effects

According to the present disclosure, a battery module is configured by changing a bus bar while remaining battery cells unchanged. The bus bar may release an electrical connection by releasing a physical contact with electrode leads when the temperature rises. Therefore, when the battery module according to the present disclosure is overheated during use, a current flow through the electrode leads may be blocked, thereby ensuring safety in an abnormal circumstance.

According to the present disclosure, even when a secondary battery protection circuit does not operate, it is possible to block the flow of current such that no more current flows, for example, to prevent charging, thereby increasing the safety of the battery module. As described above, the battery module of the present disclosure implements means that automatically blocks the flow of current when the temperature rises by improving the bus bar, thereby securing the safety of the battery module doubly together with an overcharge protection function of the secondary battery protection circuit.

According to the present disclosure, a battery module may be provide using a bus bar capable of securing safety when connecting adjacent battery cells to form an electrical connection path. When an event such as reaching an abnormal temperature occurs, the electrode leads which are in physical contact with the bus bar are released from the physical contact through deformation of the bus bar. As a result, the electrical connection between the adjacent battery cells is also released, which blocks the current flow, thereby ensuring the safety of the battery module.

According to the present disclosure, safety is ensured by improving the bus bar of the battery module. There is an advantage that the safety of the battery module may be secured through a relatively simple process change such as the bus bar proposed in the present disclosure is used instead of the existing bus bar, a physical compression is used instead of the existing welding, etc. As proposed in the present disclosure, when the bus bar is a shape memory alloy, the temperature to be restored to the original shape may be preset and an alloy in accordance with the temperature may be used, and thus the bus bar may be manufactured in accordance with the temperature requiring to block the current flow and suitably used for each battery module specification. Since the battery cells themselves use the existing manufacturing process, a process change or an adjustment to a mass production process is not necessary.

As described above, according to the present disclosure, the current flow is secured under normal circumstances and the performance of the battery module similar to the existing one is attained, and the safety of the battery module may be improved by blocking the current flow when the temperature rises to a certain temperature or more due to an abnormal circumstance. Therefore, the safety of the battery module, the battery pack including the battery module, and the vehicle including the battery pack may be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
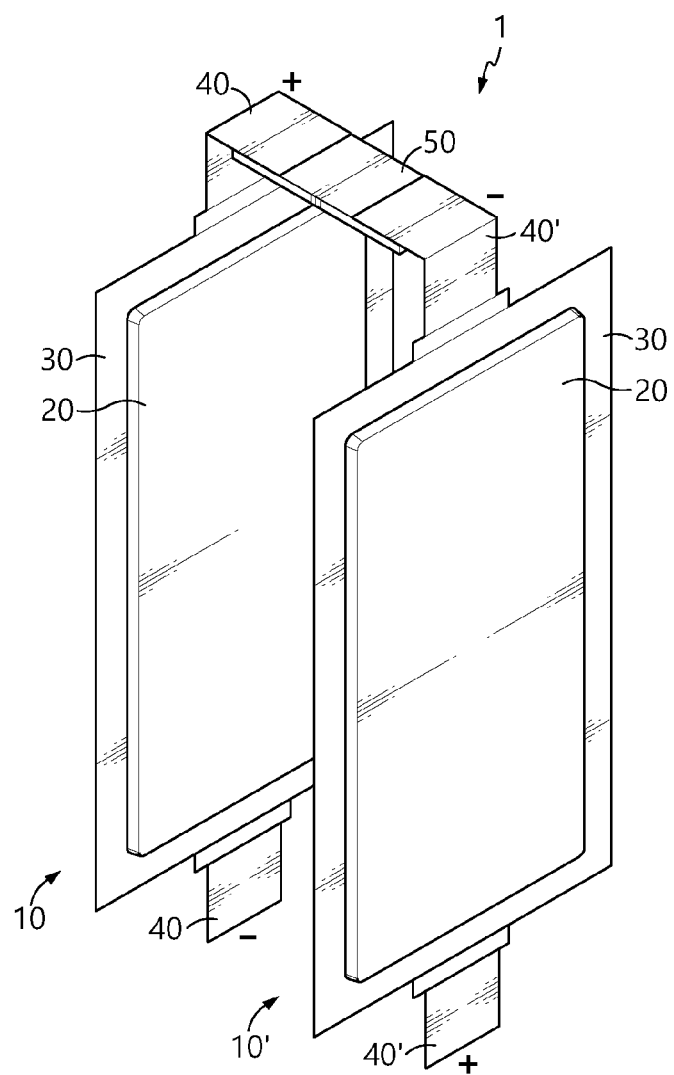
FIG. 1 schematically shows a conventional battery module.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure. The same reference numerals in the drawings denote the same elements.

In the embodiments described below, a secondary battery refers to a lithium secondary battery. Here, the lithium secondary battery is collectively referred to as a secondary battery in which lithium ions act as operating ions during charging and discharging to cause an electrochemical reaction in a positive electrode plate and a negative electrode plate.

Meanwhile, even if the name of the secondary battery changes depending on the type of an electrolyte or a separator used in the lithium secondary battery, the type of a battery case used to package the secondary battery, the structure of the inside or outside of the lithium secondary battery, etc, all secondary batteries in which lithium ions are used as operating ions should be interpreted as being included in the category of the lithium secondary battery.

The present disclosure is also applicable to secondary batteries other than the lithium secondary battery. Therefore, even if the operating ion is not the lithium ion, all secondary batteries to which the technical idea of the present disclosure may be applied should be interpreted as being included in the scope of the present disclosure regardless of their types.

Hereinafter, an embodiment of the present disclosure will be described with reference to accompanying FIGS. 2 to 5.

Figure 2:
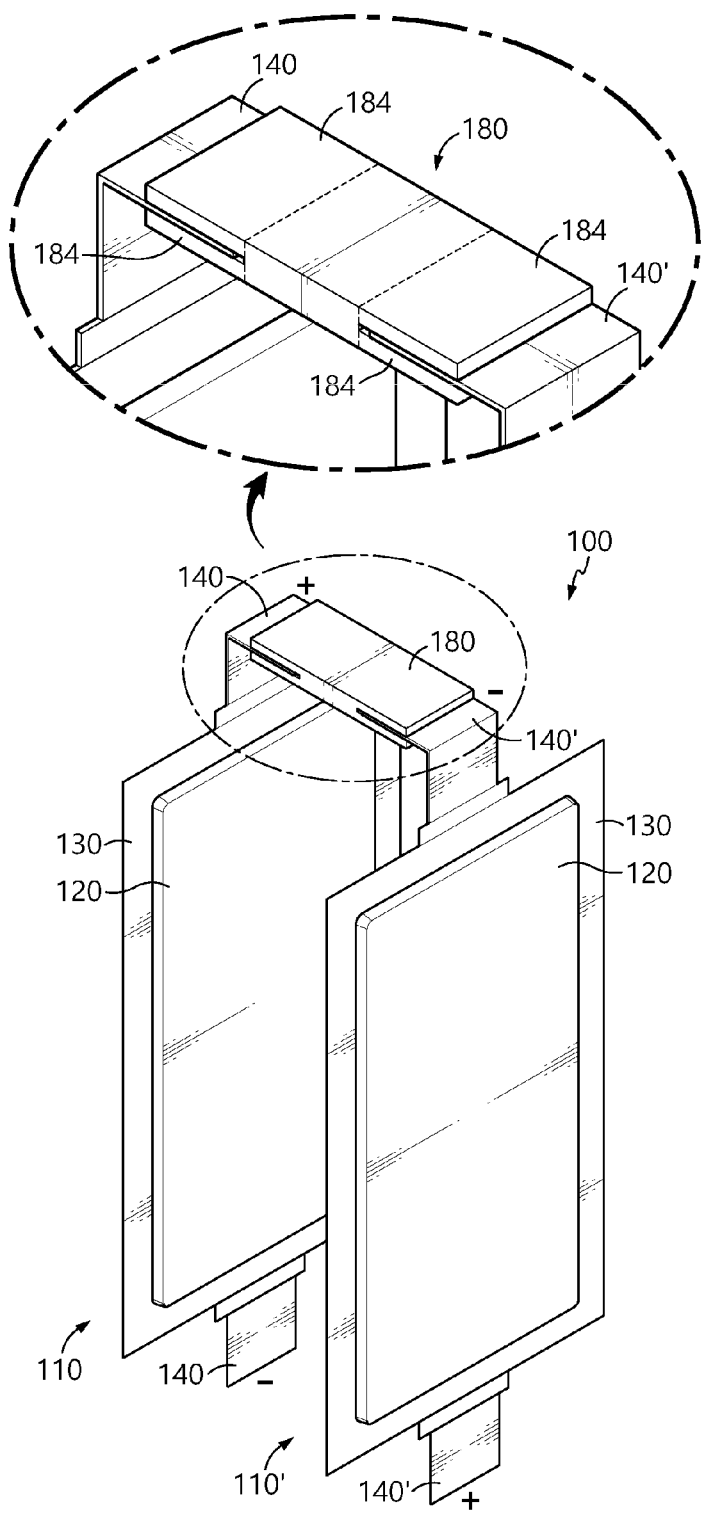
FIG. 2 is a schematic view of a battery module according to an embodiment of the present disclosure.
Figure 3:
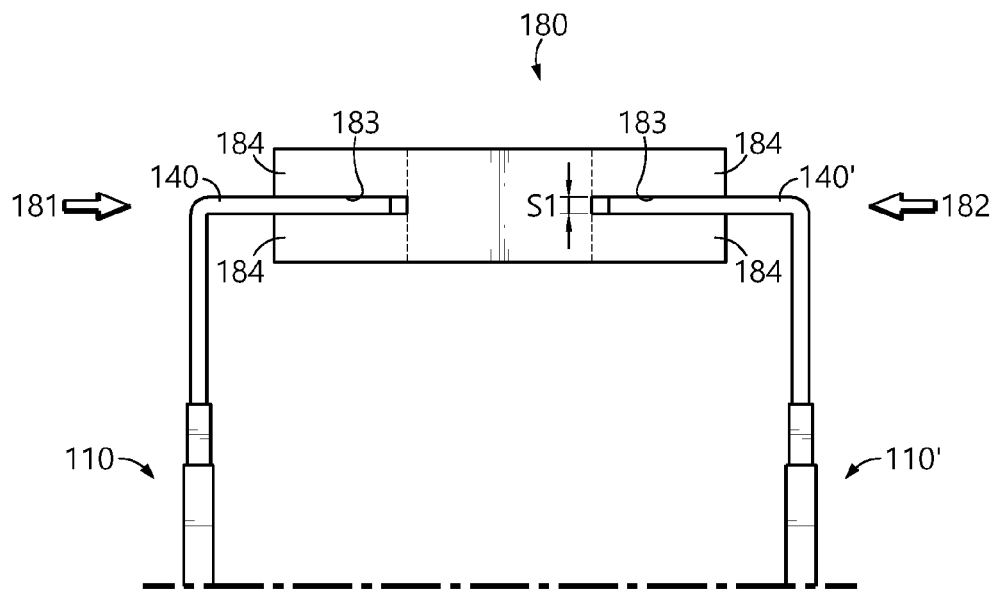
FIG. 3 is a cross-sectional view showing a coupling state between a bus bar and electrode leads in FIG. 2.
Figure 4:
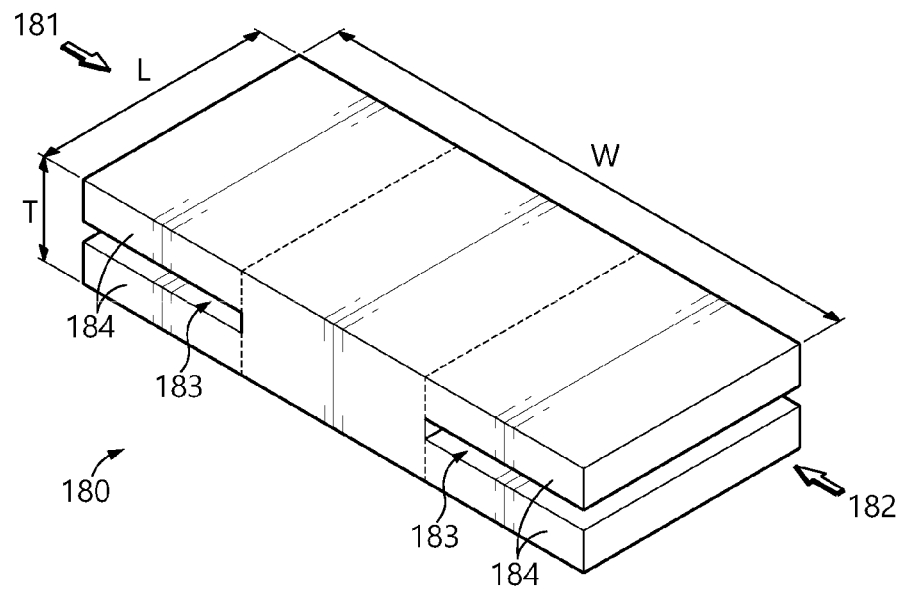
FIG. 4 is a perspective view of a bus bar included in a battery module according to an embodiment of the present disclosure.
Figure 5:
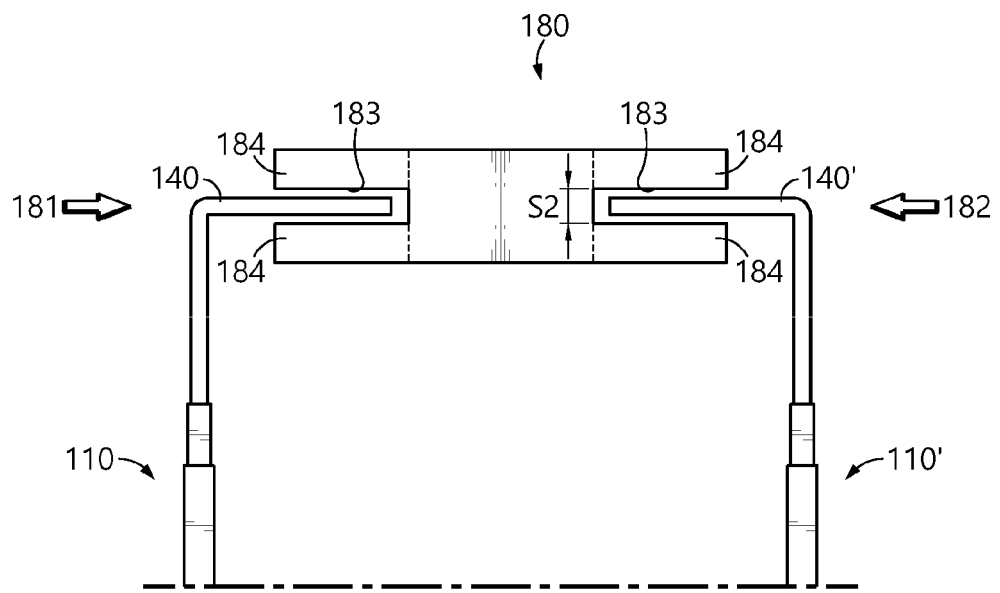
FIG. 5 is a cross-sectional view illustrating a state in which coupling between the bus bar and the electrode leads is released in the battery module of FIG. 2.

FIG. 2 is a schematic view of a battery module according to an embodiment of the present disclosure. FIG. 3 is a cross-sectional view showing a coupling state between a bus bar and electrode leads in FIG. 2. FIG. 4 is a perspective view of a bus bar included in a battery module according to an embodiment of the present disclosure. FIG. 5 is a cross-sectional view illustrating a state in which coupling between the bus bar and the electrode leads is released in the battery module of FIG. 2.

As shown in FIG. 2, a battery module 100 includes battery cells 110 and 110' and a bus bar 180. Although a larger number of battery cells may be included in the battery module 100, some of them will be shown for convenience of illustration. For example, the state where the two pouch type battery cells 110 and 110' are connected in series is shown.

However, this is merely exemplary and the present disclosure is not limited to this connection method.

The battery cells 110 and 110' are secondary batteries and include two electrode leads 140 and 140' drawn out of a pouch case 130. The electrode leads 140 and 140' are divided into a positive electrode (+) lead and a negative electrode (−) lead according to electrical polarities, and are electrically connected to an electrode assembly 120 sealed in the pouch case 130. That is, the positive electrode lead is electrically connected to a positive electrode plate of the electrode assembly 120, and the negative electrode lead is electrically connected to a negative electrode plate of the electrode assembly 120.

As shown in FIG. 3, in the battery module 100, the electrode lead 140 of the battery cell 110 and the electrode lead 140' of the other battery cell 110' adjacent thereto are bent and then are respectively inserted into both side grooves 183 of a bus bar 180, and if necessary, are compressed, such that the electrode lead 140 of the battery cell 110 and the electrode lead 140' of the other battery cell 110' are connected by means of the bus bar 180.

Referring further to FIG. 4, the bus bar 180 is in an approximately plate shape with a thin thickness T compared to a length L and a width W. The particular difference between the bus bar 180 and the existing bus bar is that the linear grooves 183 are provided in a left surface 181 and a right surface 182 along the direction of the length L, respectively.

The bus bar 180 may vary in the shape and the size so as to implement various electrical connection relationships. In general, the bus bar 180 is applied to a battery module manufacturing process as an ICB assembly in which an electrically conductive, for example, metal bus bar is combined on a frame of a plastic material in consideration of a wiring relationship rather than being used alone. The shape of the frame and the shape of the bus bar combined with the frame vary according to the connection relationship of the battery module. Thus, it will be apparent to those skilled in the art that various modifications of the present disclosure are possible.

In the present embodiment, as seen through FIGS. 2 and 3, the one battery cell 110 is positioned on the left surface 181 of the bus bar 180, and the other battery cell 110' is positioned on the right surface 182. The electrode leads 140 and 140' are respectively inserted into the grooves 183 such that the bus bar 180 and the electrode leads 140 and 140' are in physical contact and electrical contact. In this manner, the battery cells 110 and 110' may be electrically connected to each other with the bus bar 180 interposed therebetween. In an electrically connected state, for example, the groove 183 may have a size s1 and the electrode leads 140 and 140' may be in physical contact to fit the size of the groove 183. The electrode leads 140 and 140' are inserted into the grooves 183 of the bus bar 180 to be in contact with the inner surface of the bus bar 180, and the bus bars 180 and the electrode leads 140 and 140' are made of an electrically conductive material, and thus the adjacent battery cells 110 and 110' are electrically connected.

The grooves 183 may have a shape corresponding to the electrode leads 140 and 140' that are inserted therein. In other words, the grooves 183 may have the length corresponding to the widths of the electrode leads 140 and 140' and have the size corresponding to the thicknesses of the electrode leads 140 and 140' such that end portions of the electrode leads 140 and 140' drawn out of the pouch case 130 may be inserted on the approximately horizontal plane.

In an abnormal circumstance, for example, at a certain temperature or higher, the size of the grooves 183 increases in a direction of the thickness T as shown in FIG. 5 (s2>s1) such that the physical contact between the electrode leads 140 and 140' and the bus bar 180 is released. As a result, the electrical connection between the battery cells 110 and 110' is also released.

That is, the grooves 183 have a property of remaining in contact with the electrode leads 140 and 140' in a general use circumstance of the battery module 100, when the temperature rises above a certain temperature due to overcurrent, etc., causing a shape change in that the size of the grooves 183 increases, and releasing the contact with the electrode leads 140 and 140'.

Preferably, a material around at least the grooves 183 of the bus bar 180 may be a shape memory alloy that may change in the shape with the temperature such that the size of the grooves 183 may change with the temperature, and accordingly, the bus bar 180 may be in contact with the electrode leads 140 and 140' or the contact between the bus bar 180 and the electrode leads 140 and 140' may be released. In particular, in the present embodiment, when the grooves 180 are provided through a configuration in which shape memory alloy plates 184 are stacked up and down at an interval, the shape memory alloy plates 184 are restored to their originally memorized shapes at a certain temperature or higher, and thus the size of the grooves 183 may increase. Here, up and down refers to a direction of the thickness T.

The shape memory alloy refers to an alloy exhibiting a shape memory effect. Here, the shape memory effect means a phenomenon in that a shape stored at a high temperature is memorized and returns to its original shape immediately when exposed to an environment at a certain temperature or higher no matter how severe deformation is applied at a low temperature. Since the shape memory alloy has a significantly different crystal arrangement between a phase at a high temperature and a phase at a low temperature, even when its shape is deformed at the low temperature, the shape memory alloy returns to its original shape when exposed to the environment at a certain temperature or higher. Such shape memory alloys include nickel-titanium alloys (nitinol), copper-zinc alloys, copper-zinc-aluminum alloys, gold-cadmium alloys, indium-thallium alloys, etc.

If the entire bus bar 180 is made of such a shape memory alloy, or in particular, the shape memory alloy plates 184 are stacked to form a part of the bus bar 180, for example, after the bus bar 180 is manufactured to form the grooves 183 having a size (e.g., s2) larger than the thicknesses of the electrode leads 140 and 140' by using a shape memory alloy at a high temperature above a certain degree of temperature, a process of applying deformation at a low temperature may be performed such that the grooves 183 have the size s1 corresponding to the thicknesses of the electrode leads 140 and 140', and then the electrode leads 140 and 140' may be inserted into the grooves 183 to complete the electrical connection. Alternatively, the electrode leads 140 and 140' may be inserted into the grooves 183 and then physically compressed to make the inner surface of the bus bar 180 and the electrode leads 140 and 140' come into contact with each other and have the physical contact. Physical compression may be performed using a small compressor. The compression force is sufficient because the small compressor may also apply a pressure of 500 kg/cm$^2$. Therefore, the electrical contact state may be maintained through the compression by using the sufficient compression force, and thus only the physical compression is sufficient, which does not require a process such as welding.

In this process, various conditions in the process, such as the type of alloy used, the composition of the alloy, the forming temperature of the product, and the temperature or pressure when applying the deformation to the product, etc. may change in various ways, and thus a degree of a deformation of the product and the temperature and aspect at which the deformation occurs may be determined.

Accordingly, in manufacturing the bus bar 180, various conditions in the process in consideration of a temperature at which the battery cells 110 and 110' of the battery module 100 may endure, etc. may be determined and thus, the bus bar 180 may perform a current blocking function at an appropriate temperature. For example, if the bus bar 180 is manufactured by using an alloy that changes while memorizing its shape at about 200° C., the bus bar 180 may perform the current blocking function at about 200° C. when the battery module 100 is overheated.

There are several methods of connecting the battery cells 110 and 110' to each other in series inside the battery module 100. In FIGS. 2 and 3, a method of bending the electrode leads 140 and 140' respectively, and then inserting the electrode leads 140 and 140' into the both side grooves 183 of the bus bar 180, respectively, and connecting the electrode lead 140 of the battery cell 110 and the electrode lead 140' of the other battery cell 110' without welding is explained. In the present embodiment, the electrode lead 140 inserted into the groove 183 of the left surface 181 of the bus bar 180 and the electrode leads 140' inserted into the groove 183 of the right surface 182 have opposite polarities. If the electrode lead 140 inserted into the groove 183 of the left surface 181 of the bus bar 180 and the electrode leads 140' inserted into the groove 183 of the right surface 182 have the same polarity, the battery cells 110 and 110' are connected in parallel.

As such, in the present disclosure, the bus bar 180 in which the size of the grooves 183 may increase when the temperature rises is used to connect with the electrode leads 140 and 140' between the adjacent battery cells 110 and 110'. As a result, when the battery module 100 is overheated, a current flow is blocked through the deformation of the grooves 183 of the bus bar 180. Therefore, even when a secondary battery protection circuit does not operate, it is possible to block the flow of current such that no more current flows, for example, to prevent charging, thereby increasing the safety of the battery module 100. As described above, the battery module 100 of the present disclosure implements means that automatically blocks the flow of current when the temperature rises by improving the bus bar 180, thereby securing the safety of the battery module doubly together with an overcharge protection function of the secondary battery protection circuit. The safety of a battery pack including the battery module 100 and a vehicle including the battery pack may be improved.

Instead of using the existing bus bar 50 as shown in FIG. 1, if the bus bar 180 according to the present disclosure is used to manufacture the battery module 100, the battery module 100 with further improved safety may be relatively easily manufactured, and since there is no change to the battery cells 110 and 110', the existing battery cell manufacturing process may be used as it is. Therefore, it is also advantageous that a change to the already established process or an adjustment to the mass production process is not necessary.

Figure 6:
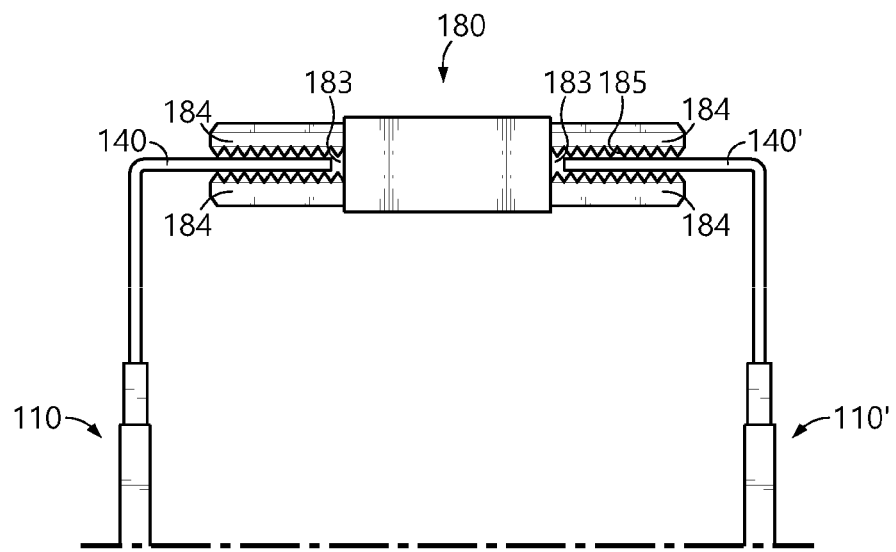
FIG. 6 is a cross-sectional view illustrating a coupling state between a bus bar and electrode leads in a battery module according to another embodiment of the present disclosure.

FIG. 6 is a cross-sectional view illustrating a coupling state between a bus bar and electrode leads in a battery module according to another embodiment of the present disclosure.

As in the previous embodiment described with reference to FIGS. 2 to 5, the bus bar 180 is provided with the grooves 183 through a configuration in which the shape memory alloy plates 184 are stacked up and down at an interval. Here, a plurality of protrusions 185 are provided on a surface of the shape memory alloy plates 184 facing each other. The protrusions 185 may have a variety of shapes, such as hemispherical, conical, truncated conical, polygonal columnar, polygonal pyramid, etc.

The protrusion 185 may act as a physical contact point or a pressure point above and below the electrode leads 140 and 140'. When the electrode leads 140 and 140' are inserted into the grooves 183 and the bus bar 180 and the electrode leads 140 and 140' are physically and electrically connected through physical compression, since the compression force applied to a narrow area of the protrusion 185 is applied at a greater pressure compared to the case where there is no protrusion 185, the contact and connection between the bus bar 180 and the electrode leads 140 and 140' may be more secure.

Figure 7:
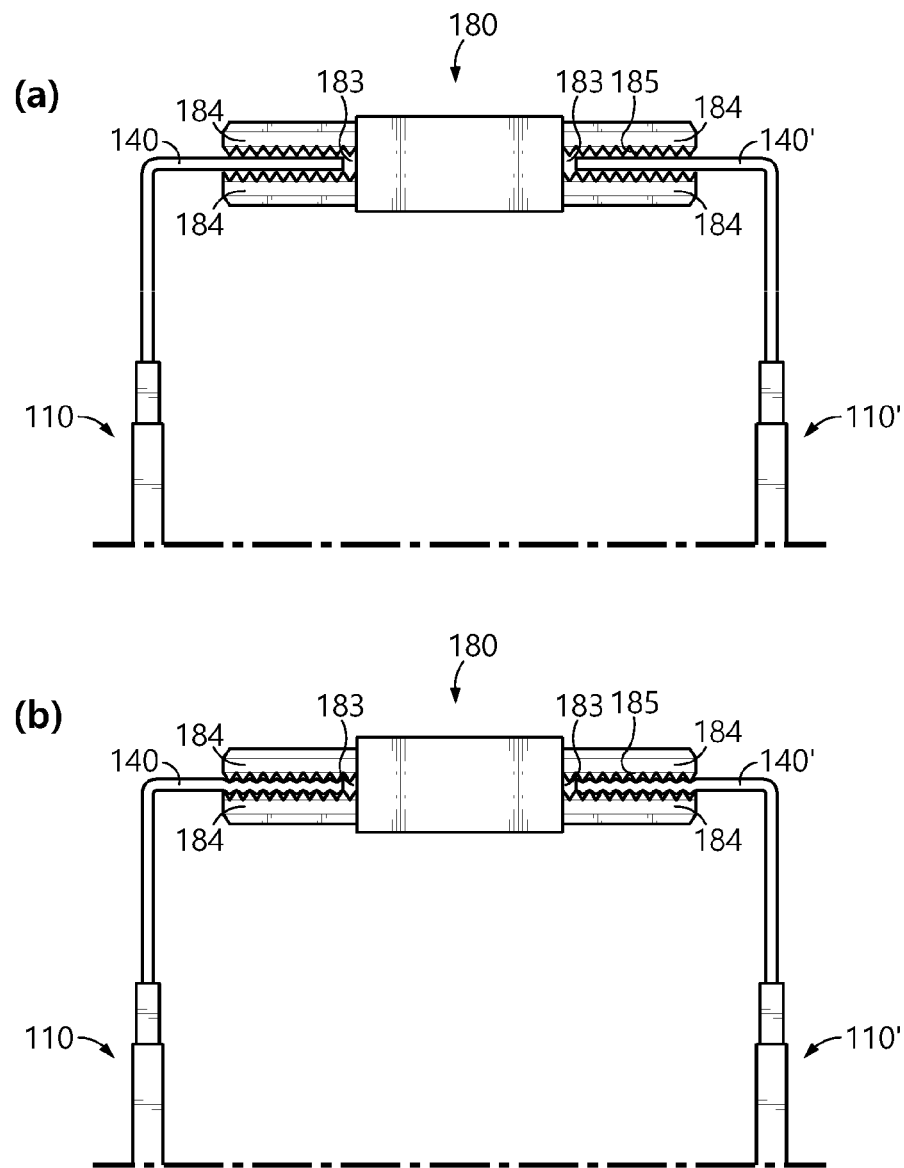
FIG. 7 is a cross-sectional view illustrating a coupling state between a bus bar and electrode leads in a battery module according to still another embodiment of the present disclosure.

FIG. 7 is a cross-sectional view illustrating a coupling state between a bus bar and electrode leads in a battery module according to still another embodiment of the present disclosure.

As in the previous embodiment described with reference to FIG. 6, the bus bar 180 is provided with the grooves 183 through a configuration in which the shape memory alloy plates 184 are stacked up and down at an interval. Here, the plurality of protrusions 185 are provided on a surface of the shape memory alloy plates 184 facing each other. The protrusions 185 are provided to engage with the protrusions 185 formed on the upper and lower shape memory alloy plates 184 upon physical compression. That is, the protrusions 185 positioned above and the projections 185 positioned below with respect to the electrode leads 140 and 140' are formed at positions that deviate from each other.

Therefore, after the electrode leads 140 and 140' are inserted into the grooves 183 as shown in FIG. 7(a), compression may be performed for the protrusions 185 only to physically and electrically connect the electrode leads 140 and 140', and as shown in FIG. 7(b), compression may be further compressed to engage the protrusions 185 formed on the upper and lower shape memory alloy plates 184 with each other. As shown in FIG. 7(b), the contact area between the electrode leads 140 and 140' and the shape memory alloy plate 184 increases more than that in FIG. 7(a), and even though an external impact is applied, there is a reduction in the concern that a physical contact state is inadvertently released due to an increase in the frictional force through an embossed contact interface between the electrode leads 140 and 140' and the shape memory alloy plate 184.

Figure 8:
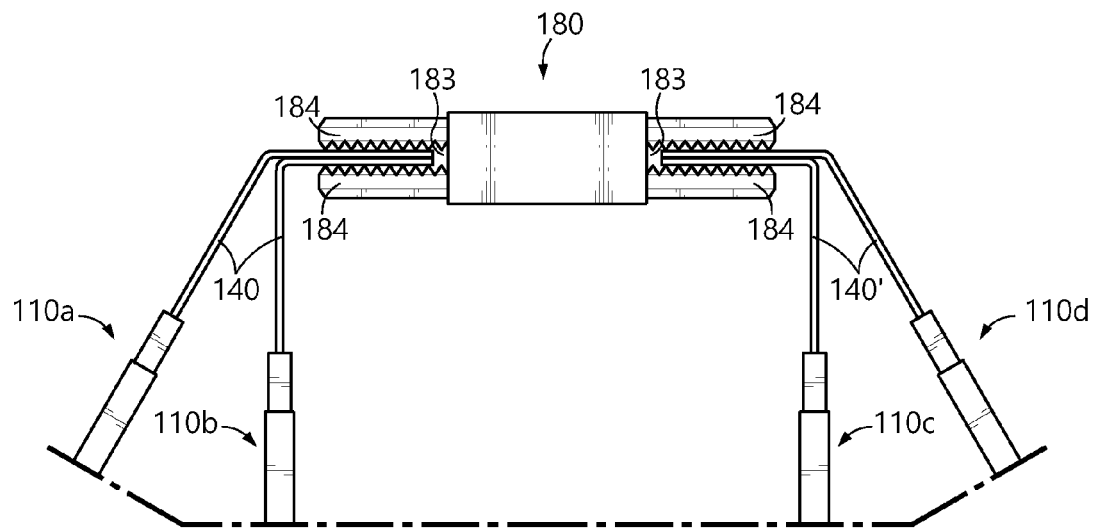
FIG. 8 is a cross-sectional view illustrating a coupling state between a bus bar and electrode leads in a battery module according to still another embodiment of the present disclosure.

FIG. 8 is a cross-sectional view illustrating a coupling state between a bus bar and electrode leads in a battery module according to still another embodiment of the present disclosure.

As in the previous embodiment described with reference to FIG. 7, the bus bar 180 is provided with the grooves 183 through a configuration in which the shape memory alloy plates 184 are stacked up and down at an interval and the plurality of protrusions 185 are provided on a surface of the shape memory alloy plates 184 facing each other.

Here, an example in which the electrode leads 140 of the same polarity are collected from two or more battery cells 110a and 110b, the electrode leads 140' of the same polarity are collected from other two or more battery cells 110c and 110d, and the electrode leads 140 and 140' are inserted into the both side grooves 183 of the bus bar 180 is given. The electrical connection between the plurality of battery cells 110a, 110b, 110c, and 110d in the battery module 100 may be connected in series, in parallel, or a mixture of series and parallel. When electrode leads of the same polarity are collected, battery cells thereof are connected in parallel. When the collected electrode leads are connected to electrode leads collected with a different polarity, battery cells thereof are connected in series. In FIG. 8, the battery cells 110a and 110b on the right surface with respect to the bus bar 180 are connected in parallel, the battery cells 110c and 110d on the left surface are connected in parallel, and the battery cells 110a and 110b and the battery cells 110c and 110d are connected in series.

Figure 9:
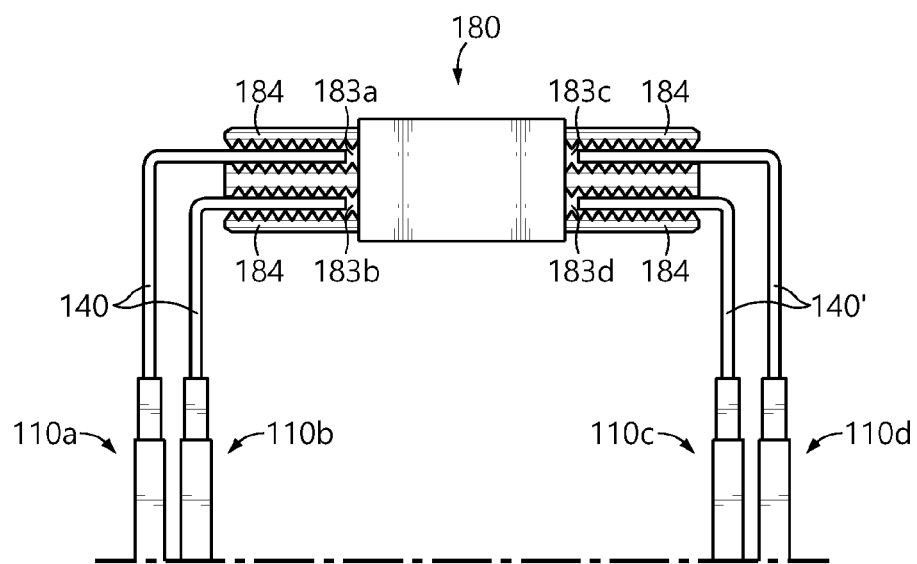
FIG. 9 is a cross-sectional view illustrating a coupling state between a bus bar and electrode leads in a battery module according to still another embodiment of the present disclosure.

FIG. 9 is a cross-sectional view illustrating a coupling state between a bus bar and electrode leads in a battery module according to still another embodiment.

As in FIG. 8, the electrode leads 140 of the two or more battery cells 110a and 110b are connected to the right surface of the bus bar 180, and the electrode leads 140' of the other two or more battery cells 110c and 110d are connected to the left surface of the bus bar 180. FIG. 8 illustrates an example in which electrode leads of the same polarity are collected and inserted into one groove 183. However, in the present embodiment, an example in which grooves 183a, 183b, 183c, and 183d are provided as many as the number of electrode leads such that the electrode leads 140 and 140' are respectively inserted into the grooves 183a, 183b, 183c, and 183d and pressed.

In the above embodiments, for example, an electrical connection between one battery cell 110 and another battery cell 110' is released through the release of a physical contact between the bus bar 180 and the electrode leads 140 and 140' through the deformation of the bus bar 180 when the battery module 100 reaches a certain temperature such as about 200° C. Therefore, a normal current flow path is formed in a normal current range, and accordingly a normal temperature range, and when the battery module 100 reaches an abnormal temperature of about 200° C. due to overcurrent, the current flow path is blocked. As such, the contact between the bus bar 180 and the electrode leads 140 and 140' is released only when overheated, thereby ensuring safety against ignition and explosion due to the abnormal temperature. There is also an advantage that an energy density is not reduced since it does not occupy a space in the module, such as a PTC device or a fuse which is a different safety enhancing device.

According to the present disclosure, a battery module is configured by changing a bus bar while remaining battery cells unchanged. The bus bar may release an electrical connection by releasing a physical contact with electrode leads when the temperature rises. Therefore, when the battery module according to the present disclosure is overheated during use, a current flow through the electrode leads may be blocked, thereby ensuring safety in an abnormal circumstance.

According to the present disclosure, even when a secondary battery protection circuit does not operate, it is possible to block the flow of current such that no more current flows, for example, to prevent charging, thereby increasing the safety of the battery module. As described above, the battery module of the present disclosure implements means that automatically blocks the flow of current when the temperature rises by improving the bus bar, thereby securing the safety of the battery module doubly together with an overcharge protection function of the secondary battery protection circuit.

According to the present disclosure, a battery module may be provide using a bus bar capable of securing safety when connecting adjacent battery cells to form an electrical connection path. When an event such as reaching an abnormal temperature occurs, the electrode leads which are in physical contact with the bus bar are released from the physical contact through deformation of the bus bar. As a result, the electrical connection between the adjacent battery cells is also released, which blocks the current flow, thereby ensuring the safety of the battery module.

According to the present disclosure, safety is ensured by improving the bus bar of the battery module. There is an advantage that the safety of the battery module may be secured through a relatively simple process change such as the bus bar proposed by the present disclosure is used instead of the existing bus bar, a physical compression is used instead of the existing welding, etc. When the bus bar is a shape memory alloy, the temperature to be restored to the original shape may be adjusted, and thus the bus bar may be manufactured in accordance with the temperature requiring to block the current flow and suitably used for each battery module specification. Since the battery cells themselves use the existing manufacturing process, a process change or an adjustment to a mass production process is not necessary.

As described above, according to the present disclosure, the current flow is secured under normal circumstances and the performance of the battery cell similar to that of the existing electrode lead is expressed, and the safety of the battery module may be improved by blocking the current flow when the temperature rises to a certain temperature or more due to an abnormal circumstance. Therefore, the safety of the battery module, the battery pack including the battery module, and the vehicle including the battery pack may be improved.

Since the battery module according to the present disclosure has excellent safety, the battery module is also suitable for use as a power source for a medium and large device requiring high temperature stability, long cycle characteristics, high rate characteristics, etc. Preferred examples of the medium and large device include a power tool that is driven by an electric motor; electric vehicles including EV, HEV, PHEV, and the like; electric motorcycles including e-bikes and e-scooters; electric golf carts; and ESS, but are not limited thereto.

Figure 10:
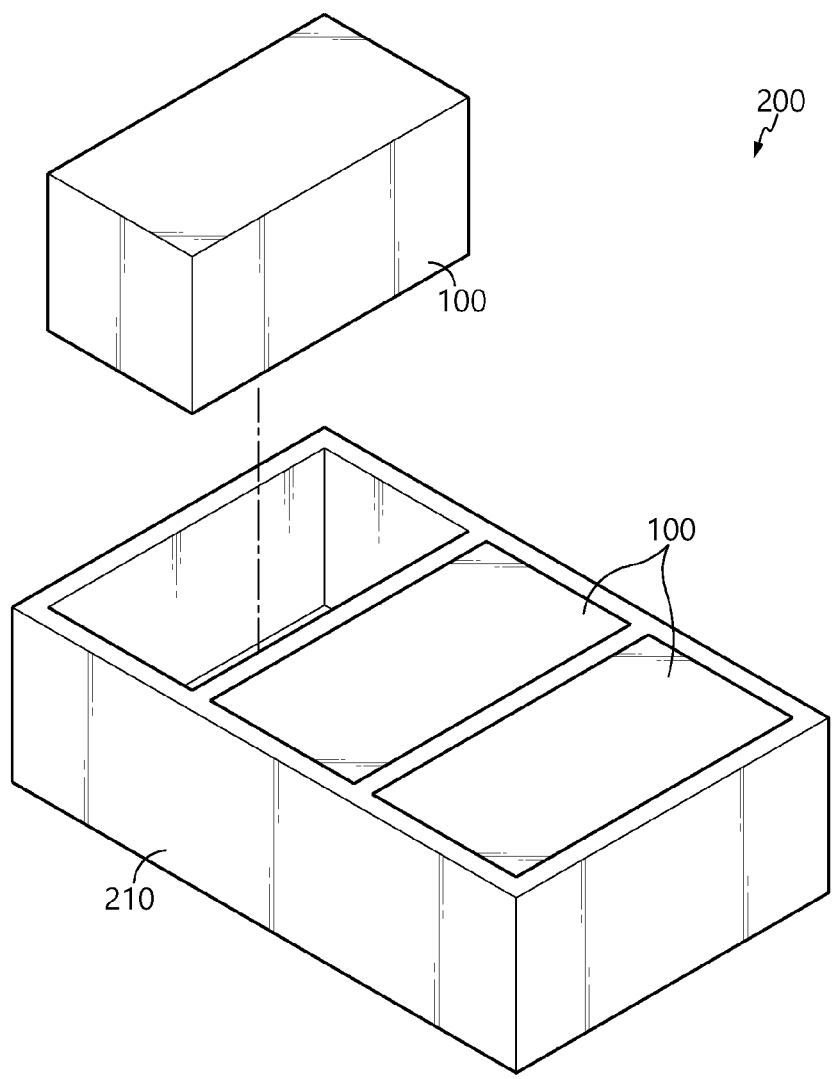
FIG. 10 is a diagram illustrating a battery pack according to still another embodiment of the present disclosure.
Figure 11:
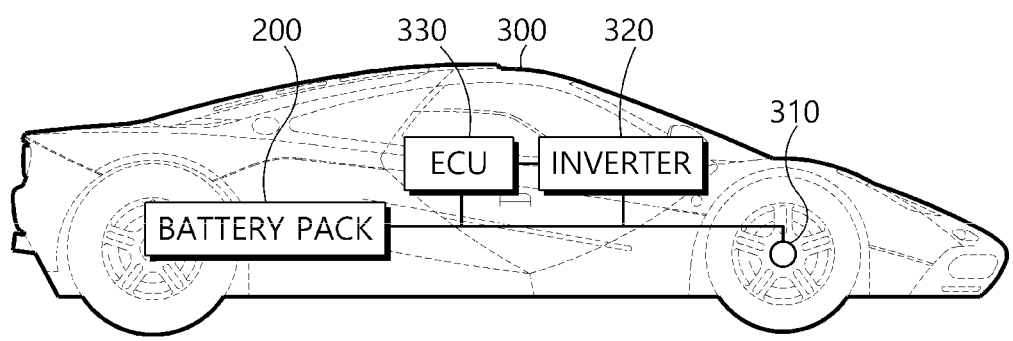
FIG. 11 is a diagram illustrating a vehicle according to still another embodiment of the present disclosure.

FIG. 10 is a diagram illustrating a battery pack according to another embodiment of the present disclosure. FIG. 11 is a diagram illustrating a vehicle according to another embodiment of the present disclosure.

Referring to FIGS. 10 and 11, a battery pack 200 may include at least one battery module according to the foregoing embodiment, for example, the battery module 100 of the second embodiment and a pack case 210 for packaging the battery pack 200. In addition, the battery pack 200 according to the present disclosure, in addition to the battery module 100 and the pack case 210, may further include various devices for controlling charging and discharging of the battery module 100, such as a battery management system (BMS), a current sensor, a fuse, etc.

The battery pack 200 may be provided in a vehicle 300 as a fuel source of the vehicle 300. For example, the battery pack 200 may be provided in the vehicle 300 in other ways that may utilize electric vehicles, hybrid vehicles, and the other battery pack 200 as fuel sources.

Preferably, the vehicle 300 may be an electric vehicle. The battery pack 200 may be used as an electric energy source that drives the vehicle 300 by providing a driving force to a motor 310 of the electric vehicle. In this case, the battery pack 200 has a high nominal voltage of 100V or higher. In a hybrid vehicle, the battery pack 200 is set to 270V.

The battery pack 200 may be charged or discharged by an inverter 320 according to the driving of the motor 310 and/or an internal combustion engine. The battery pack 200 may be charged by a regenerative charging device coupled with a break. The battery pack 200 may be electrically connected to the motor 310 of the vehicle 300 through the inverter 320.

The battery pack 200 also includes the BMS. The BMS estimates the state of battery cells in the battery pack 200 and manages the battery pack 200 using estimated state information. For example, the BMS estimates and manages state information of the battery pack 200 such as state of charge (SOC) of the battery pack 200, state of health (SOH), maximum input/output power allowance, output voltage, etc. In addition, the BMS may use the state information to control the charging or discharging of the battery pack 200, and further, estimate the replacement time of the battery pack 200.

An ECU 330 is an electronic control device for controlling the state of the vehicle 300. For example, the ECU 330 determines torque information based on information such as an accelerator, a brake, a speed, etc., and controls the output of the motor 310 to match the torque information. In addition, the ECU 330 transmits a control signal to the inverter 320 such that the battery pack 200 may be charged or discharged based on the state information such as SOC and SOH of the battery pack 200 received by the BMS. The inverter 320 causes the battery pack 200 to be charged or discharged based on the control signal of the ECU 330. The motor 310 drives the vehicle 300 based on control information (e.g., torque information) transmitted from the ECU 330 using electric energy of the battery pack 200.

The vehicle 300 includes the battery pack 200 according to the present disclosure. The battery pack 200 includes the battery module 100 with improved safety as described above. Therefore, the stability of the battery pack 200 is improved, the battery pack 200 is excellent in stability and may be used for a long time, and thus the vehicle 300 including the battery pack 200 is safe and easy to operate.

In addition, the battery pack 200 may also be provided in other devices, equipment, and facilities, such as an ESS using a secondary battery, in addition to the vehicle 300.

As such, the battery pack 200 according to the present embodiment and devices or equipment and facilities including the battery pack 200, such as the vehicle 300, include the battery module 100 described above, and thus the battery pack 200 having all the advantages owing to the battery module 100 described above and devices or equipment and facilities such as the vehicle 300 including the battery pack 200 may be implemented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module comprising:
a bus bar having a thin plate shape having a top surface and a bottom surface spaced from the top surface in a thickness direction, a left surface and a right surface spaced from each other in a length direction and having linear grooves provided in the left surface between a top edge and a bottom edge of the left surface and the right surface between a top edge and a bottom edge of the right surface along the length direction, respectively; and
battery cells respectively located on the left surface and the right surface of the bus bar, an electrode lead of each of the battery cells inserted into a respective one of the grooves, and electrically connected to each other with the bus bar interposed therebetween,
wherein sizes of the grooves increase in the thickness direction above a predetermined temperature to release a physical contact between the electrode leads and the bus bar such that an electrical connection between the battery cells is released, and
wherein the grooves are formed by shape memory alloy plates stacked in the thickness direction of the bus bar.

2. The battery module of claim 1, wherein the electrode leads are inserted into the grooves and are physically compressed therein.

3. The battery module of claim 1, wherein a plurality of protrusions are provided on surfaces of the shape memory alloy plates that face each other.

4. The battery module of claim 3, wherein the electrode leads are inserted into the grooves and are physically compressed therein, and the plurality of protrusions on an upper shape memory alloy plate are provided to engage with the plurality of protrusions on a lower shape memory alloy plate upon physical compression.

5. The battery module of claim 1, wherein the electrode leads have opposite polarities.

6. The battery module of claim 5, wherein the electrode leads are of a same polarity.

7. The battery module of claim 1, wherein two or more grooves are provided in at least one of the left surface and the right surface of the bus bar.

8. A battery pack comprising:
at least one battery module according to claim 1; and
a pack case configured to package the at least one battery module.

9. A vehicle comprising at least one battery pack according to claim 8.

* * * * *